(12) United States Patent
Vincent et al.

(10) Patent No.: US 11,579,763 B2
(45) Date of Patent: Feb. 14, 2023

(54) SMOOTH IMAGE SCROLLING WITH DISK I/O ACTIVITY OPTIMIZATION AND ENHANCEMENT TO MEMORY CONSUMPTION

(71) Applicant: FUJIFILM MEDICAL SYSTEMS U.S.A., INC., Stamford, CT (US)

(72) Inventors: Brigil Vincent, Morrisville, NC (US); Maneesh Chirangattu, Morrisville, NC (US)

(*) Notice: Subject to any disclaimer, the term of this patent is extended or adjusted under 35 U.S.C. 154(b) by 0 days.

(21) Appl. No.: 16/901,502

(22) Filed: Jun. 15, 2020

(65) Prior Publication Data

US 2020/0310612 A1    Oct. 1, 2020

Related U.S. Application Data

(63) Continuation-in-part of application No. 16/248,437, filed on Jan. 15, 2019.

(51) Int. Cl.
*G06F 3/0485* (2022.01)
*G06F 16/538* (2019.01)
*G06F 12/0871* (2016.01)
*G06F 12/02* (2006.01)

(52) U.S. Cl.
CPC ........ *G06F 3/0485* (2013.01); *G06F 12/0253* (2013.01); *G06F 12/0871* (2013.01); *G06F 16/538* (2019.01)

(58) Field of Classification Search
CPC ............. G06F 12/0253; G06F 12/0871; G06F 16/538; G06F 3/0485
See application file for complete search history.

(56) References Cited

U.S. PATENT DOCUMENTS

| | | | |
|---|---|---|---|
| 6,574,629 B1 * | 6/2003 | Cooke, Jr. | G16H 30/20 |
| 8,867,807 B1 * | 10/2014 | Fram | A61B 5/742 |
| | | | 382/128 |
| 8,954,884 B1 * | 2/2015 | Barger | G06F 3/0482 |
| | | | 715/792 |
| 9,501,415 B1 * | 11/2016 | Racine | G06F 12/0868 |
| 10,404,923 B1 * | 9/2019 | Pena | H04N 5/232939 |
| 10,790,056 B1 * | 9/2020 | Accomazzi | G06N 3/0454 |

(Continued)

FOREIGN PATENT DOCUMENTS

| | | | | |
|---|---|---|---|---|
| GB | 2323946 A | * | 10/1998 | G06F 16/51 |
| JP | 2009198639 A | * | 9/2009 | |

OTHER PUBLICATIONS

Machine generated translation of Japanese Patent Document #JP2009198639A to Hayashi (Year: 2009).*

Primary Examiner — Daniel T Tekle
(74) Attorney, Agent, or Firm — Heslin Rothenberg Farley & Mesiti P.C

(57) ABSTRACT

A system and method for performing image scrolling are disclosed. In one embodiment, a system for image scrolling organizes each set of related images as a series object. The system writes selected images from one of the series objects, from the image cache to the frame buffer, for image scrolling on a display. A garbage collection module performs garbage collection in the image cache. The garbage collection module operates on memory space where a series object is released or can be moved, for reclaiming memory. The image scrolling is smoother than if the garbage collection module were to track and operate on each image as an object.

15 Claims, 14 Drawing Sheets

(56) References Cited

U.S. PATENT DOCUMENTS

| | | | |
|---|---|---|---|
| 2006/0082809 A1* | 4/2006 | Loukipoudis | G16H 10/60 358/1.15 |
| 2007/0124541 A1* | 5/2007 | Lang | G06F 12/0862 711/137 |
| 2008/0168195 A1* | 7/2008 | Feihl | G16H 30/20 710/52 |
| 2008/0229071 A1* | 9/2008 | Shioya | G06F 12/0862 712/207 |
| 2009/0274384 A1* | 11/2009 | Jakobovits | G16H 30/20 382/254 |
| 2010/0281402 A1* | 11/2010 | Staikos | G06F 16/957 715/760 |
| 2012/0005630 A1* | 1/2012 | Ohba | G09G 5/14 715/853 |
| 2012/0284664 A1* | 11/2012 | Zhao | G06F 3/0485 715/784 |
| 2013/0080701 A1* | 3/2013 | Markovitz | H04L 47/11 711/115 |
| 2013/0159383 A1* | 6/2013 | Tuliani | H04L 67/2842 709/203 |
| 2014/0035916 A1* | 2/2014 | Murphy | G06T 15/08 345/427 |
| 2014/0055474 A1* | 2/2014 | Otala | G06F 16/901 345/536 |
| 2014/0115020 A1* | 4/2014 | Colaco | G16H 30/40 707/827 |
| 2014/0140589 A1* | 5/2014 | Klotzer | G16H 30/20 382/128 |
| 2014/0143298 A1* | 5/2014 | Klotzer | G06F 16/9577 709/203 |
| 2014/0245219 A1* | 8/2014 | McAllister | G06F 3/0488 715/784 |
| 2014/0325372 A1* | 10/2014 | Spracklen | G06F 9/452 715/740 |
| 2015/0149506 A1* | 5/2015 | Raizada | G16H 10/60 707/792 |
| 2016/0092446 A1* | 3/2016 | Nye | G16H 10/60 705/3 |
| 2016/0292155 A1* | 10/2016 | Adriaensens | G06F 16/24564 |
| 2020/0310557 A1* | 10/2020 | Parkos | G06F 3/0354 |

* cited by examiner

Learning Engine
[1.1] Receive input from user
[1.2] Store inputs to input history
[1.3] Notify input arrival to learning engine
[1.4] Fetch historical inputs
[1.5] Update playback behavior Image Loader
[2.1] Fetch playback behavior
[2.2] WADO request to imaging service
[2.2] Cache displayable images Playback Engine
[3.1, 3.2] Synchronize user inputs and playback engine
[3.3] Fetch playback behavior
[3.4] Fetch displayable image from cache
[3.5] Draw image in viewport

FIG. 4

SMOOTH IMAGE SCROLLING WITH DISK I/O ACTIVITY OPTIMIZATION AND ENHANCEMENT TO MEMORY CONSUMPTION

The present application is a continuation-in-part of and claims the benefit of U.S. patent application Ser. No. 16/248,437 filed Jan. 15, 2019, which is hereby incorporated by reference.

FIELD OF THE INVENTION

Embodiments of the present invention relate to the field of viewing medical images; more particularly, embodiments of the present invention relate to changing the navigation of medical images dynamically while a user is viewing the images.

BACKGROUND

Current medical imaging technology includes the use of medical images such as, among others, x-rays, mammograms, computerized tomography (CT) scans, magnetic resonance images (MRIs), positron emission tomography (PET) scans and ultrasound images. These images are generated by medical imaging modalities.

Medical facilities are more readily adopting electronic displays for displaying medical images. The medical images are often Digital Imaging and Communications in Medicine (DICOM) images. Often after an imaging modality takes medical images, those images are included in a study that is sent to a picture archiving and communication system (PACS). The PACS is a medical imaging technology that allows access to images from multiple locations. Doctors and/or other medical professionals obtain studies that are stored in the PACS and review, or read, the images in the studies to obtain clinical information about their patients. If a patient has a serious medical condition that needs urgent attention, the doctor is often able to make that determination by reviewing the images in the study.

Doctors and/or other medical professionals often view the images on workstation that has a display. To view the images from a study on the workstation, the images are rendered at a remotely-located server and then the rendered images are downloaded through a network for display on the workstation. The rendering of a particular image occurs in real-time in response to a request to view the image.

When reviewing DICOM images to locate anatomies and lesions, it is essential that the navigation through the DICOM images is seamless. Cine images are viewed as movies that illustrate the motion of a patient's heart and can be obtained via segmented imaging. Current methods of cine playback are not suitable for quickly change navigation speed and direction as radiologist navigate through the DICOM images. Also, current manual scrolling mechanisms are not suitable for changing navigation speed smoothly when scrolling through anatomies.

SUMMARY OF THE INVENTION

In one embodiment, a system for image scrolling has an image cache, a frame buffer, one or more processors, and a garbage collection module. The one or more processors are to organize each set of related images as a series object, for a plurality of series objects. The one or more processors are to write selected images of one of the plurality of series objects from the image cache to the frame buffer, for image scrolling on a display. The garbage collection module is to perform garbage collection in the image cache by operating on memory space where a series object is released or can be moved, for reclaiming memory. The image scrolling is smoother than if the garbage collection module were to track and operate on each image as an object.

In one embodiment, a method for image scrolling is performed by a processor-based system. The method includes organizing each set of related images as a series object, for a plurality of series objects. The method includes writing selected images of one of the plurality of series objects from an image cache to a frame buffer, for image scrolling on a display. The method includes performing garbage collection in the image cache by operating on memory space where a series object is released or can be moved, for reclaiming memory. The image scrolling is smoother than if the garbage collection were to track and operate on each image as an object.

In one embodiment, a tangible, non-transitory, computer-readable media has instructions thereupon which, when executed by a processor, cause the processor to perform various actions. The processor is to organize each set of related images is a series object, or a plurality of series objects. The processor is to write selected images of one of the plurality of series objects from an image cache to a frame buffer, for image scrolling on a display. The processor is to perform garbage collection in the image cache, by operating on memory space where a series object is released or can be moved, for reclaiming memory. The image scrolling is smoother than if the garbage collection were to track and operate on each image as an object.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 illustrates an operations list for a learning engine, an image loader and a playback engine for one embodiment of a medical image management system.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Embodiments of the present invention are directed to systems, methods, and graphical user interfaces (GUIs) for rendering and displaying medical, or healthcare, images. The systems, methods, and GUIs of the present invention provide seamless navigation through images, such as those, for example, found in healthcare studies or series. In one embodiment, these images are DICOM multi-frame or non-multiform images of a study or series. The techniques disclosed herein allow a radiologist to control or change navigation behavior on the fly. Having briefly described an overview of the present invention, embodiments of the invention will be discussed with reference to FIGS. 1-14.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Having briefly described embodiments of the present invention, an exemplary operating environment suitable for use in implementing embodiments of the present invention is described below.

Figure 1:
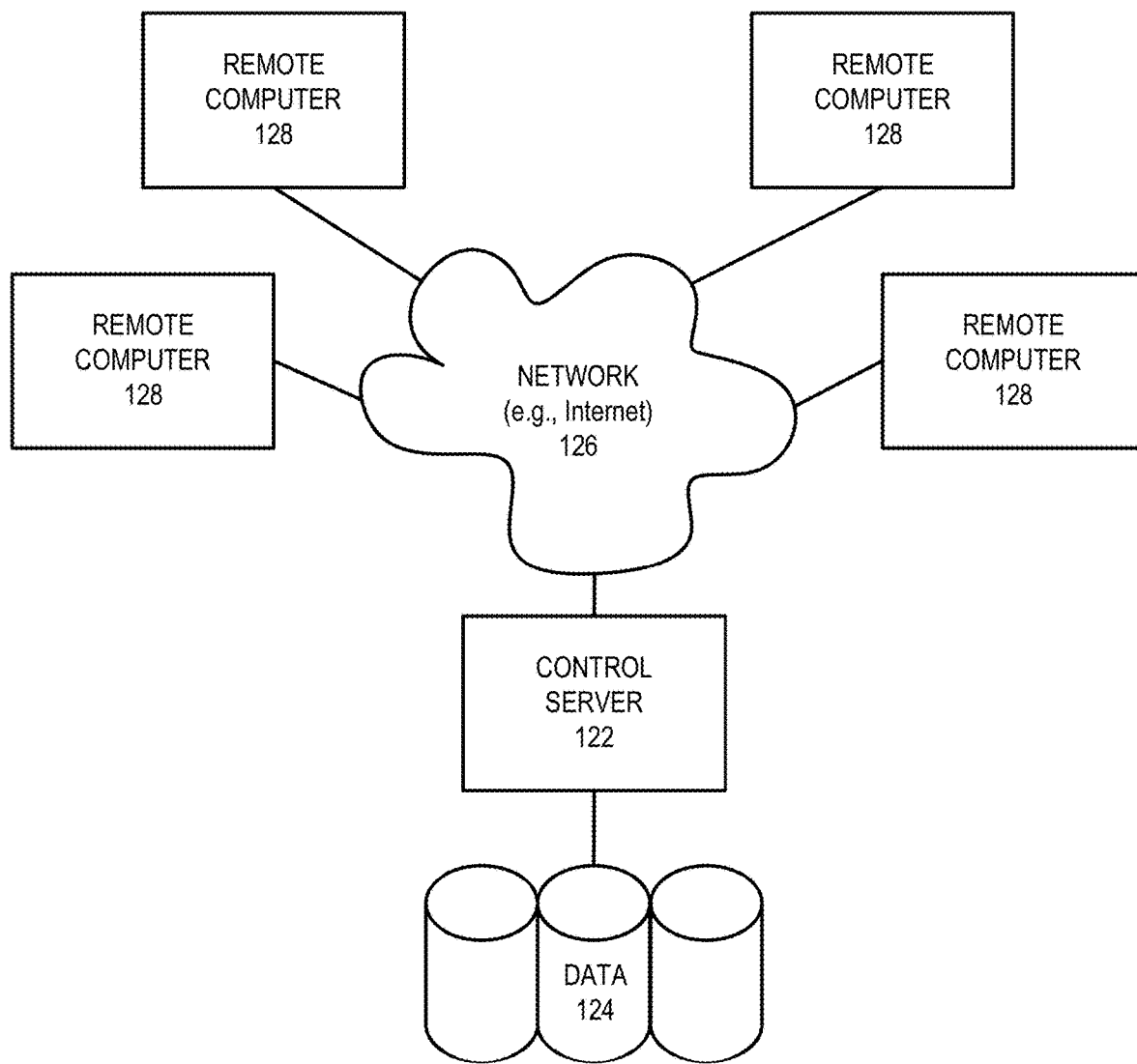
FIG. 1 illustrates an exemplary a medical information computing system environment, with which embodiments of the present invention may be implemented.

Referring to the drawings in general, and initially to FIG. 1 in particular, a medical information computing system environment, with which embodiments of the present invention may be implemented is illustrated and designated generally as reference numeral 120. It will be understood and appreciated by those of ordinary skill in the art that the illustrated medical information computing system environment 120 is merely an example of one suitable computing environment and is not intended to suggest any limitation as to the scope of use or functionality of the invention. Neither should the medical information computing system environment 120 be interpreted as having any dependency or requirement relating to any single component or combination of components illustrated therein.

Embodiments of the present invention may be operational with numerous general-purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, programmable consumer electronics, network PCs, minicomputers, mainframe computers, distributed computing environments that include any of the above-mentioned systems or devices, and the like.

Embodiments of the present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

With continued reference to FIG. 1, the exemplary medical information computing system environment 120 includes a general-purpose computing device in the form of a control server 122. Components of the control server 122 may include, without limitation, a processing unit, internal system memory, and a suitable system bus for coupling various system components, including database cluster 124, with the control server 122. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 122 typically includes therein, or has access to, a variety of computer-readable media, for instance, database cluster 124. Computer-readable media can be any available media that may be accessed by server 122, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 122. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 124, provide storage of computer-readable instructions, data structures, program modules, and other data for the control server 122. The control server 122 may operate in a computer network 126 using logical connections to one or more remote computers 128. Remote computers 128 may be located at a variety of locations in a medical or research environment, for example, but not limited to, clinical laboratories (e.g., molecular diagnostic laboratories), hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as intensivists, surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, veterinarians, students, and the like. The remote computers 128 may also be physically located in non-traditional medical care environments so that the entire health care community may be capable of integration on the network. The remote computers 128 may be personal computers, servers, routers, network PCs, peer devices, other common network nodes, or the like, and may include some or all of the elements described above in relation to the control server 122. The devices can be personal digital assistants or other like devices.

Exemplary computer networks 126 may include, without limitation, local area networks (LANs) and/or wide area networks (WANs). Such networking environments are commonplace in offices, enterprise-wide computer networks, intranets, and the Internet. When utilized in a WAN networking environment, the control server 122 may include a modem or other means for establishing communications over the WAN, such as the Internet. In a networked environment, program modules or portions thereof may be stored in association with the control server 122, the database cluster 124, or any of the remote computers 128. For example, and not by way of limitation, various application programs may reside on the memory associated with any one or more of the remote computers 128. It will be appreciated by those of ordinary skill in the art that the network connections shown are exemplary and other means of establishing a communications link between the computers (e.g., control server 122 and remote computers 128) may be utilized.

In operation, a clinician may enter commands and information into the control server 122 or convey the commands and information to the control server 122 via one or more of the remote computers 128 through input devices, such as a keyboard, a pointing device (commonly referred to as a mouse), a trackball, or a touch pad. Other input devices may include, without limitation, microphones, scanners, or the like. Commands and information may also be sent directly from a remote healthcare device to the control server 122. In addition to a monitor, the control server 122 and/or remote computers 128 may include other peripheral output devices, such as speakers and a printer.

Although many other internal components of the control server 122 and the remote computers 128 are not shown, those of ordinary skill in the art will appreciate that such components and their interconnection are well known. Accordingly, additional details concerning the internal construction of the control server 122 and the remote computers 128 are not further disclosed herein.

Figure 2:
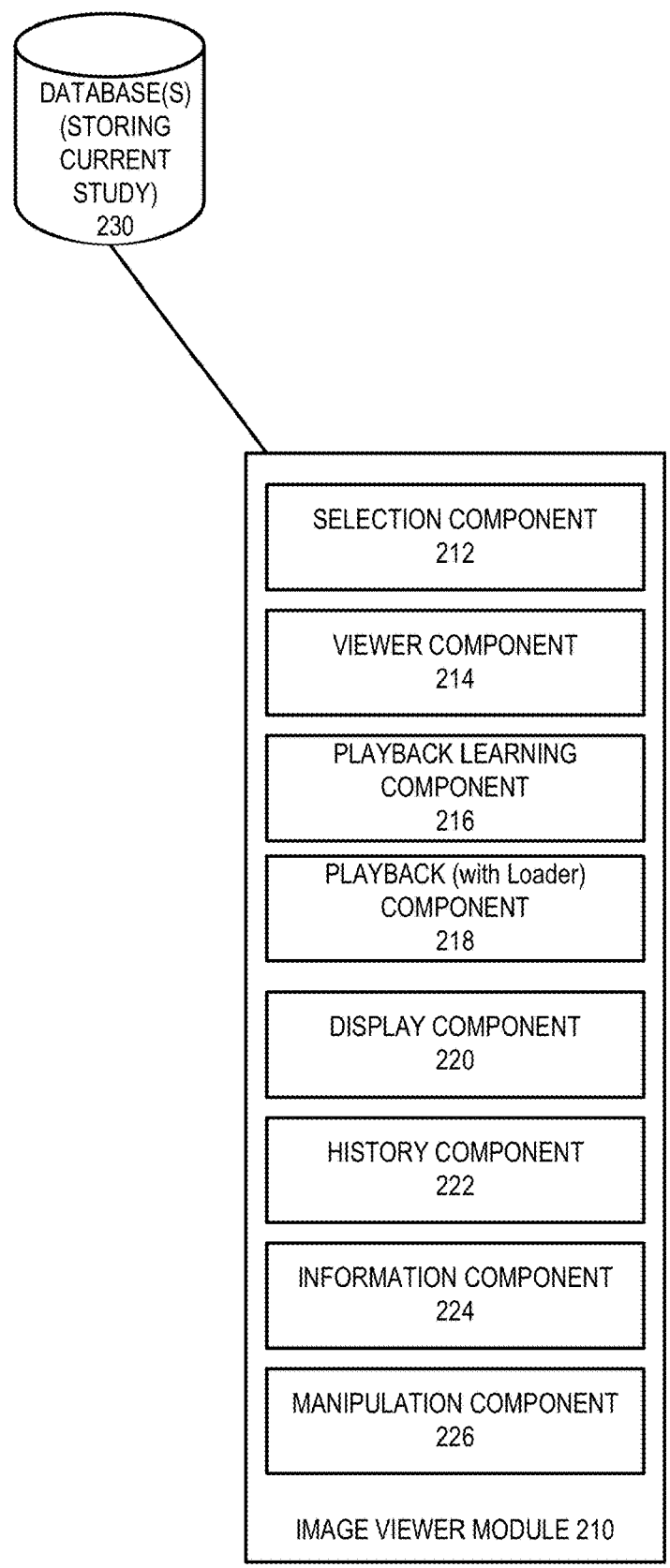
FIG. 2 is a block diagram showing one embodiment of a computing system architecture for displaying series images in a graphical user interface (GUI).

With reference to FIG. 2, a block diagram is illustrated that shows an exemplary computing system architecture for seamless viewing of medical images (e.g., DICOM images) in a low network speed environment by locally rendering images using compressed image pixel data cached locally. It will be appreciated that the computing system architecture shown in FIG. 2 is merely an example of one suitable computing system and is not intended as having any dependency or requirement related to any single module/component or combination of modules/components.

The computing system includes an image viewer 210 and one or more databases 230, storing and maintaining medical images from image series of multiple healthcare studies. Exemplary medical images include radiology images, laboratory images, pictures, cardiology images, such as ECHO images, and other healthcare images. One of skill in the art will appreciate that the databases may be maintained separately or may be integrated. Databases 230 may contain images that are linked to a patient's electronic medical record (EMR), such that images may be selected from within the EMR and launched and displayed within a viewer via the image viewer 210. As utilized herein, the acronym "EMR" is not meant to be limiting, and may broadly refer to any or all aspects of the patient's medical record rendered in a digital format. Generally, the EMR is supported by systems configured to co-ordinate the storage and retrieval of individual records with the aid of computing devices. As such, a variety of types of healthcare-related information may be stored and accessed in this way. By way of example, the EMR may store one or more of the following types of information: patient demographic; medical history (e.g., examination and progress reports of health and illnesses); medicine and allergy lists/immunization status; laboratory test results, radiology images (e.g., X-rays, CTs, MRIs, etc.); other images; evidence-based recommendations for specific medical conditions; a record of appointments and physician's notes; billing records; and data received from an associated medical device. Accordingly, systems that employ EMRs reduce medical errors, increase physician efficiency, and reduce costs, as well as promote standardization of healthcare. Display component 220 includes a graphical display device that may be a monitor, computer screen, project device or other hardware device for displaying output capable of displaying graphical user interfaces.

Image viewer 210 receives and displays images that are sourced from more than one source, or database. Thus, a single storage repository or a single PACS system is not required. Image viewer 210 may reside on one or more computing devices, such as, for example, the control server 122 described above with reference to FIG. 1. By way of example, the control server 122 includes a computer processor and may be a server, personal computer, desktop computer, laptop computer, handheld device, mobile device, consumer electronic device, or the like.

Image viewer 210 comprises selection component 212, viewer component 214, playback learning component 216, playback component 218, and display component 220. In various embodiments, image viewer 210 includes a history component 222, an information component 224, and a manipulation component 226. It will be appreciated that while image viewer 210 is depicted as receiving healthcare images from a current study stored in database 230, image viewer 210 may receive healthcare images from multiple sources including databases spread across multiple facilities and/or multiple locations. It will also be appreciated that image viewer 210 may receive healthcare images from the sources described above via links within a patient's EMR.

The selection component 212 receives a selection of a healthcare study. A healthcare study comprises one or more series. Each series comprises one or more images depicting the subject of the image from various angles. A list perspective within a multimedia manager provides a list of available studies, images, and other media. A clinician can select the desired items to launch in the viewer. In one embodiment, the selection of desired items may be made within the EMR.

Once the selection component 212 receives the clinician's selection, the viewer component 214 launches the viewer for the selected studies or series. These images may be cine images or other medical images. Playback component 218 playbacks images of the selected studies using the view of viewer component 214 according to a playback behavior, thereby allowing a user to smoothly scroll the images. In one embodiment, playback component 218 fetches displayable images from memory (e.g., a local cache) and draws the images in a viewport of the viewer. The display component 220 displays the one or more images of the current study or series in the viewer.

Playback learning component 216 receives user inputs (e.g., mouse movements) from the user during playback and uses those inputs with other historical user inputs to update the playback behavior. In one embodiment, this update occurs while the user is viewing the images during playback.

In one embodiment, a history component 222 displays a history of different studies and clinical images associated with the more than one healthcare image. The history component 222 further allows a selection of one or more images from the history to be displayed in the viewer by the display component 220. For example, the selection component 212 may have received a selection from the clinician of a particular study. However, once the display component 220 has displayed the images that comprise that selected study, the history component 222 may display other studies and clinical images that are of particular interest to the clinician. The clinician may then select additional items from the history to launch within the viewer.

In one embodiment, information component 224 displays additional information associated with the more than one healthcare image, the history, or a combination thereof. The additional information comprises patient identifying information, image related information, study related information, or a combination thereof. Such additional information may also include time related information.

In one embodiment, a manipulation component 226 allows a clinician to manipulate a display of a healthcare image. For example, a clinician may determine that the image as it is rendered within the viewer is not large enough to see a desired level of detail. The clinician may zoom in or out and the manipulation component 226 manipulates the display of the image accordingly. Similarly, the clinician may desire to pan an image and the manipulation component 226 manipulates the image display accordingly.

Figure 3:
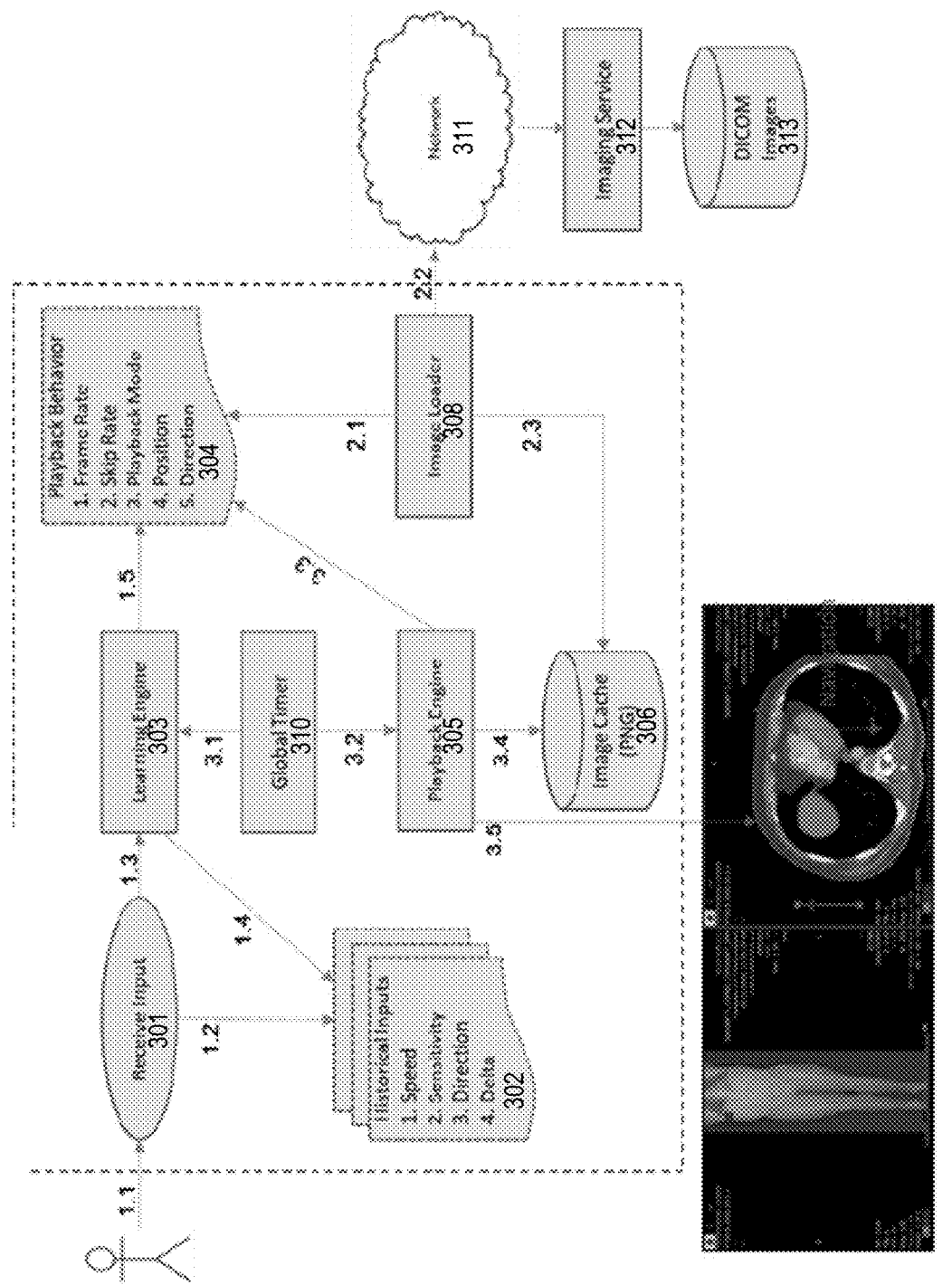
FIG. 3 is a data flow diagram of one embodiment of a process for image rendering being performed with a medical image management system.

FIG. 3 is a data flow diagram of one embodiment of a process for image rendering being performed with a medical image management system. The medical image management system performs image rendering and viewing to create a layout in the GUI with at least one image from one image series of the current study. In one embodiment, the medical image management system provides seamless viewing of medical images (e.g., DICOM images) in low network speed environment by caching compressed image pixel data in the system and rendering images locally. In one embodiment, the system is implemented with one of the viewers of FIG. 2 or the system of FIG. 7.

In one embodiment, the medical image management system comprises a network communication interface to receive images of a healthcare study; an image cache memory to cache the images; one or more processors coupled to the network connection interface and the memory and configured to dynamically change playback behavior for navigating through images of the healthcare study based on analyzing historical user inputs made with one or more user input devices while a user is navigating through the images; and a display coupled to the one or more processors to display the images in a viewport or other graphical user interface (GUI). In one embodiment, the processors change the navigation speed and direction of the playback behavior while images are being reviewed by a user. In one embodiment, this change in the playback behavior occurs seamlessly while the user scrolls through the images. In one embodiment, the processors implement a learning engine to derive the playback behavior for navigating through images based on analyzing historical user inputs made with one or more user input devices and a playback engine to perform playback of images according to the playback behavior, wherein the display is operable to display the images with the viewer under direction of the playback engine.

Referring to FIG. 3, in one embodiment, the process for image rendering being performed with the medical image management system has three logical parts.
1. A Learning Engine 303: Learn from historical inputs (from user input devices (e.g., mouse or other cursor control movements, touchscreen inputs, keyboard inputs, etc.) and derive playback behavior 304.
2. An Image Loader 308: Pre-fetch and cache displayable images (e.g., DICOM images) from an imaging service 312 (e.g., a remotely located server(s), etc.), where the prefetching in one embodiment is through a Web Access to DICOM Objects (WADO) interface from imaging service 312.
3. A Playback Engine 305: Seamless playback through DICOM images.

One embodiment of the operations associated with part is depicted in FIG. 4. As shown in FIG. 4, and described in more detail below, operations numbered 1.1-1.5 in FIGS. 3 and 4 are associated with learning engine 303 and include receiving input from the user [1.1], storing input attributes to history 302 [1.2], notifying learning engine 303 of the arrive of user inputs [1.3], learning engine 303 fetching historical input attributes [1.4], and learning engine 303 creation and/or updating playback behavior 304 [1.5]. Similarly, operations numbered 2.1-2.3 in FIGS. 3 and 4 are associated with image loader 308 and include image loader 308 fetching playback behavior 304 [2.1], image loader 308 performing a request (e.g., a WADO request) to imaging service 312 [2.2], and image loader 308 caching displayable images into cache 306 [2.3] Lastly, operations numbered 3.1-3.5 in FIGS. 3 and 4 are associated with playback engine 305 and include synchronizing user inputs 301 and playback engine 305 [3.1], [3.2], playback engine 305 fetching playback behavior 304 [3.3], playback engine 304 fetching one or more displayable images from cache 306 [3.4], and playback engine 304 drawing one or more images in the viewport [3.5]. These operations are described in more detail below.

Referring both FIGS. 3 and 4, the system receives one or more user inputs 301 made by a user viewing images with the medical image management. These user inputs are made with user input devices such as, for example, but not limited to, a mouse or other cursor control device, a touchscreen displaying graphical user interface (GUI) elements, keyboard. The user inputs are stored in a memory (302).

Learning engine 303 is notified of and receives user inputs (301). In one embodiment, the inputs are received by learning engine 303 continuously. The learning engine caches attributes of user input into memory 302. In one embodiment, in the case of a mouse, the attributes of the user inputs that are stored are speed of mouse movement, mouse sensitivity, direction of movement, and the delta (or the distance between adjacent mouse movements), which is the total amount of physical distance (e.g., total movement in x and y directions) between the previous movement and the current movement.

Learning engine 303 fetches the most recent historical inputs from memory and analyzes them together with image information (e.g., DICOM image information). In one embodiment, the image information comprises the modality that created the image and other images in the study or series or the type of images, the number of image instances (e.g., a large number of images such as with a full body scan (e.g., 1000 images), a small number of images (e.g., 4 to 8 images, etc.), patient position and direction vectors (e.g., a combination of image plane and view position of the 3D volume though which user is navigating, etc.). In one embodiment, learning engine 303 interprets the user intention from the analysis and translates it into playback behavior 304 which consists of attributes defining playback behavior (304). In one embodiment, attributes of playback behavior 304 include one or more of frame rate, skip rate, playback mode, patient position and direction vector. The frame rate is the frequency at which the images are displayed in the sequence. The skip rate is the rate at which frames are skipped, which may depend on the frame rate and the ability of the human eye to visualize frames when the navigation through the frames is occurring at certain speeds. The playback mode refers to the manner in which the user is navigating through the images (e.g., proceeding to a couple of images in the middle of the study first and then going back to an earlier image). Patient position is the area to which the user is moving. The direction refers to the direction vectors which are a combination of image plane and view position of the 3D volume though which user is navigating. In one embodiment, the playback behavioral attributes include all of these attributes. In other words, learning engine 303 dynamically modifies playback behavior 304 used to display images of a study or series. In one embodiment, this dynamic change or modification occurs while the user is viewing images from the study or series. That is, the modification occurs while the playback is occurring.

For example, in one embodiment, learning engine 303 determines that the user's mouse movements have increase in speed and interprets this to mean that the user desires to increase the navigation speed while navigating through the images. Thus, learning engine 303 increases the frame rate, which may mean the skip rate is increased to maintain that frame rate. The skip rate might also be increased because the user is moving very quickly with the mouse from one area to the next. In another example, while the user is interacting with the images, the inputs associated with those movements are being recorded, such as how fast the user moved the mouse to move through the images, and the direction of those movements (e.g., back and forth through some of the images, etc.) and, from these and other historical inputs and image information, the learning engine derives a behavior. In one embodiment, each of these factors causes the navigation to be changed. For example, in the case of the number of image instances, the skip rate is determined based on number of images in the series; and for a smaller size series, the rate of skip is also small. With respect to the modality, for example, MG images are required to be aligned with the breast bounding box by loading additional bounding box information from server during navigation. In the case of the type of image, for example, larger images require pre-fetch for smooth scrolling and images with spatial information require spatial synchronization with other viewports. With respect to patient position, for example, the skip rate is decided based on adjacent patient positions where slices having large spatial position difference are navigated without skipping images. In the case of direction vectors, for example, a 3D volume requires direction vectors to decide the playback direction based on the plane and user's view direction. Thus, each of these can influence the playback behavior and the learning engine 303 is able to determine playback behavior 304 based on these factors.

Playback behavior 304 is used by both an image loader 308 that is responsible for loading images into a memory of the medical image management system and by playback engine 305 that plays back images to the user according to playback behavior 304. In one embodiment, image loader 308 loads images for playback so that the images are available in displayable format in the cache well ahead in order facilitate seamless playback without having to stop due to image unavailability. Image loader 308 accesses playback behavior 304 and uses it to determine which images to cache. In one embodiment, image loader 308 sends requests for images via a network interface of the medical image management system over network 311 (e.g., the Internet). In one embodiment, image loader 308 sends the request as a Web Access to DICOM Objects (WADO) request to an imaging service 312 for retrieving rendered displayable images (e.g., DICOM images). In one embodiment, imaging service 312 is at a remotely located server, receives the request from network 311 and fetches the image images from DICOM image storage 313. After fetching image, imaging service 312 renders the image pixel data into images. After rendering, the rendered images are sent back to the medical image management system via network 311 where they are received by the management system's network interface and cached in image cache 306 by image loader 308 so that they are available for display during user navigation. Thus, image loader 308 operates in accordance with playback behavior 304 composed by learning engine 303 in order to make sure the images intended for display will always available for playback.

Playback engine 305 focuses on continuous and smooth playback navigation through images based on playback behavior 304 composed by learning engine 303. In one embodiment, playback engine 305 access playback behavior 304 and fetches displayable images from cache memory 306 and draws each image in the viewport or other GUI for display on the display of the medical image management system. In one embodiment, playback engine 305 also makes sure, quick interactive stop or start in navigation by radiologist or other medical personnel at specific slice will be honored.

In one embodiment, a global timer 310 controls playback engine 305. Global timer 310 synchronizes the user inputs 301 and playback engine 305, which enables learning engine 303 to be synchronized with playback engine 305.

Figure 5:
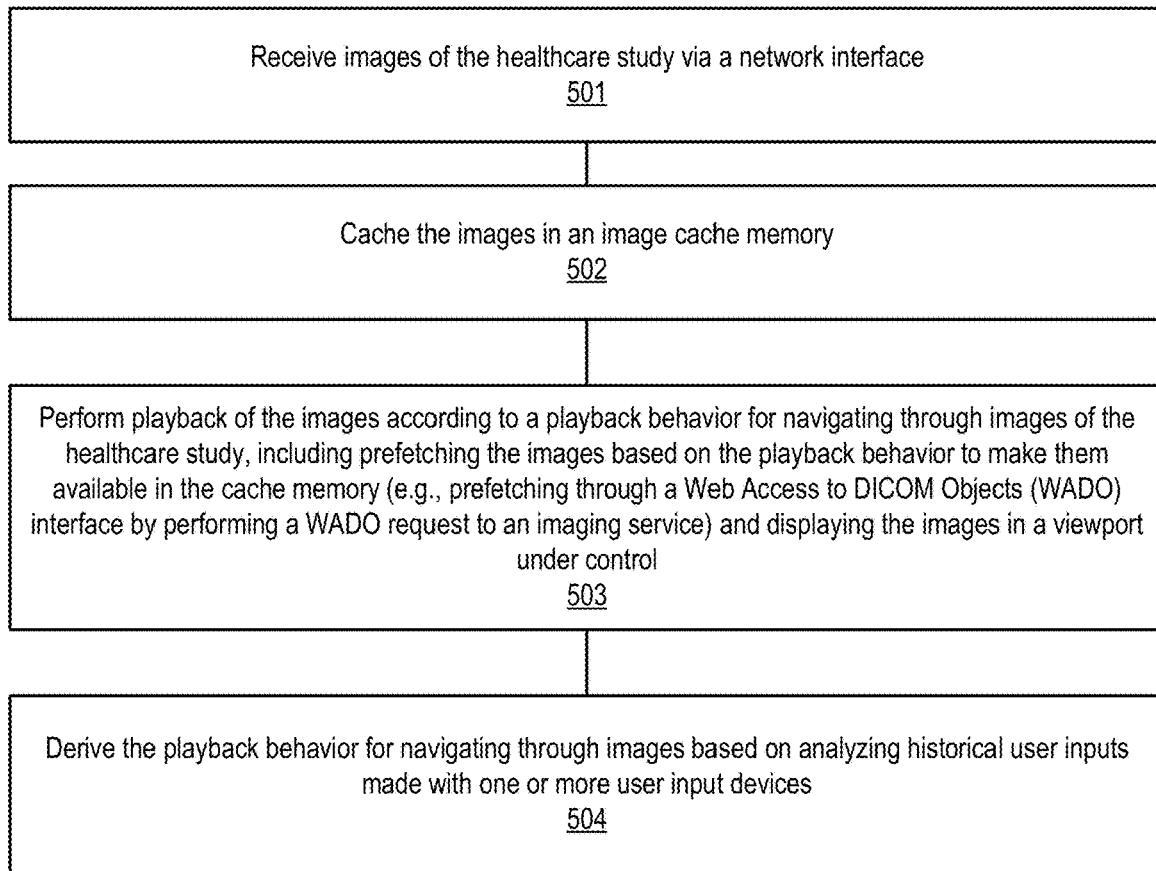
FIG. 5 is a flow diagram of one embodiment of a process for displaying images in a graphical user interface (GUI).

FIG. 5 is a flow diagram of one embodiment of a process for displaying series images in a graphical user interface (GUI). In one embodiment, the processes are performed by processing logic that may comprise hardware (circuitry, dedicated logic, etc.), software (e.g., software running on a chip), firmware, or a combination of the three. In one embodiment, the process is performed by a medical image management system having an image processor, an image renderer, and a display.

Referring to FIG. 5, the process begins by processing logic receiving images of the healthcare study via a network interface (processing block 501) and caching the images in an image cache memory (processing block 502). In one embodiment, the images are part of healthcare studies. In one embodiment, the images are received from an imaging service that is remote to the medical image management system.

Once images have been received, processing logic performs playback of the images according to a playback behavior for navigating through images of the healthcare study, including prefetching the images based on the playback behavior to make them available in the cache memory (e.g., prefetching through a Web Access to DICOM Objects (WADO) interface by performing a WADO request to an imaging service) and displaying the images in a viewport under control (processing block 503).

Figure 6:
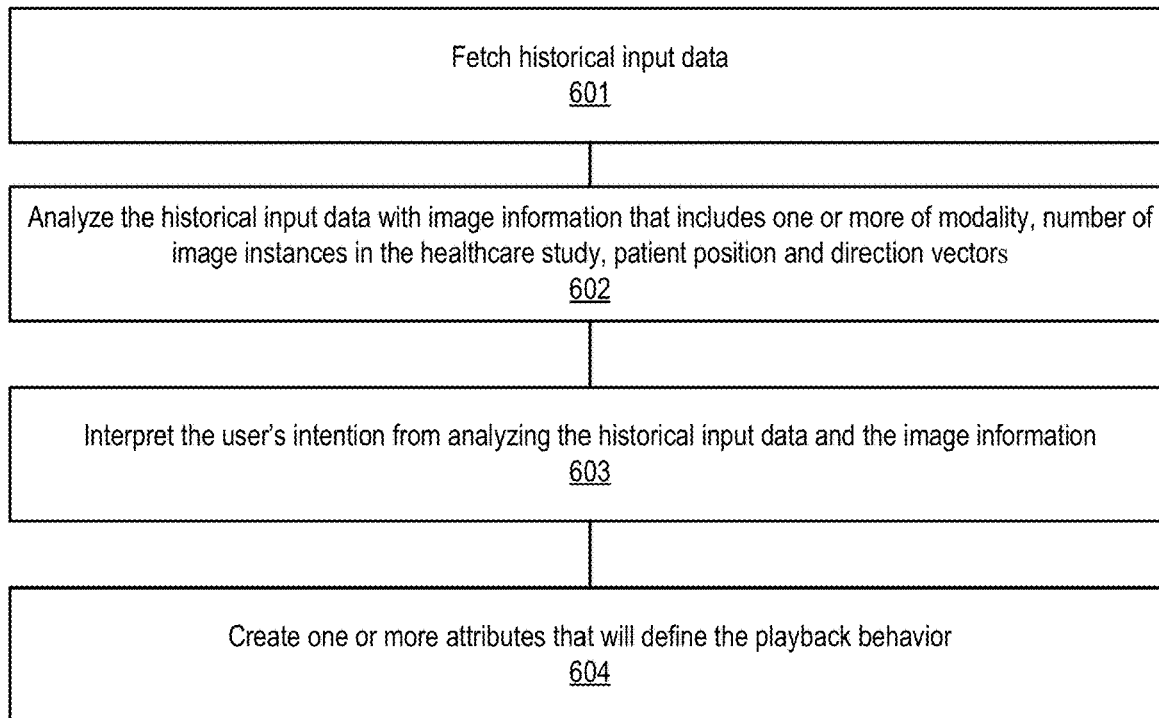
FIG. 6 is a flow diagram of one embodiment of a process for deriving the playback behavior for navigating through images based on analyzing historical user inputs made with one or more user input devices.

In one embodiment, while performing playback of the images, processing logic derives the playback behavior for navigating through images based on analyzing historical user inputs made with one or more user input devices (processing block 504). FIG. 6 is a flow diagram of one embodiment of a process for deriving the playback behavior for navigating through images based on analyzing historical user inputs made with one or more user input devices. In one embodiment, the processes are performed by processing logic that may comprise hardware (circuitry, dedicated logic, etc.), software (e.g., software running on a chip), firmware, or a combination of the three. In one embodiment, the process is performed by a medical image management system having a playback learning engine, a playback engine, and a display. Referring to FIG. 6, the process begins by fetching historical input data (processing block 601). In one embodiment, the historical input data comprises one or more of speed of mouse movement, mouse sensitivity, direction of movement, and delta. In one embodiment, the historical data comprises all of these inputs. Next, processing logic analyzes the historical input data with image information that includes one or more of modality, number of image instances in the healthcare study, patient position and direction vectors (processing block 602) and interprets the user's intention from analyzing the historical input data and the image information (processing block 603). Using the interpreted user intention, processing logic creates one or more attributes that will define the playback behavior (processing block 604). That is, the attributes set the playback to occur in a particular way. In one embodiment, the attributes comprise one or more of frame rate, skip rate, playback mode, patient position and direction vector.

Returning to FIG. 5, after deriving the playback behavior, processing logic dynamically changes the playback behavior based on analyzing historical user inputs made with one or more user input devices while a user is navigating through the images. In one embodiment, dynamically changing the playback behavior comprises changing navigation speed and direction of the playback behavior while images are being reviewed by a user. In one embodiment, dynamically changing the playback behavior occurs seamlessly while the user scrolls through the images.

An Exemplary Medical Imaging Management System

Figure 7:
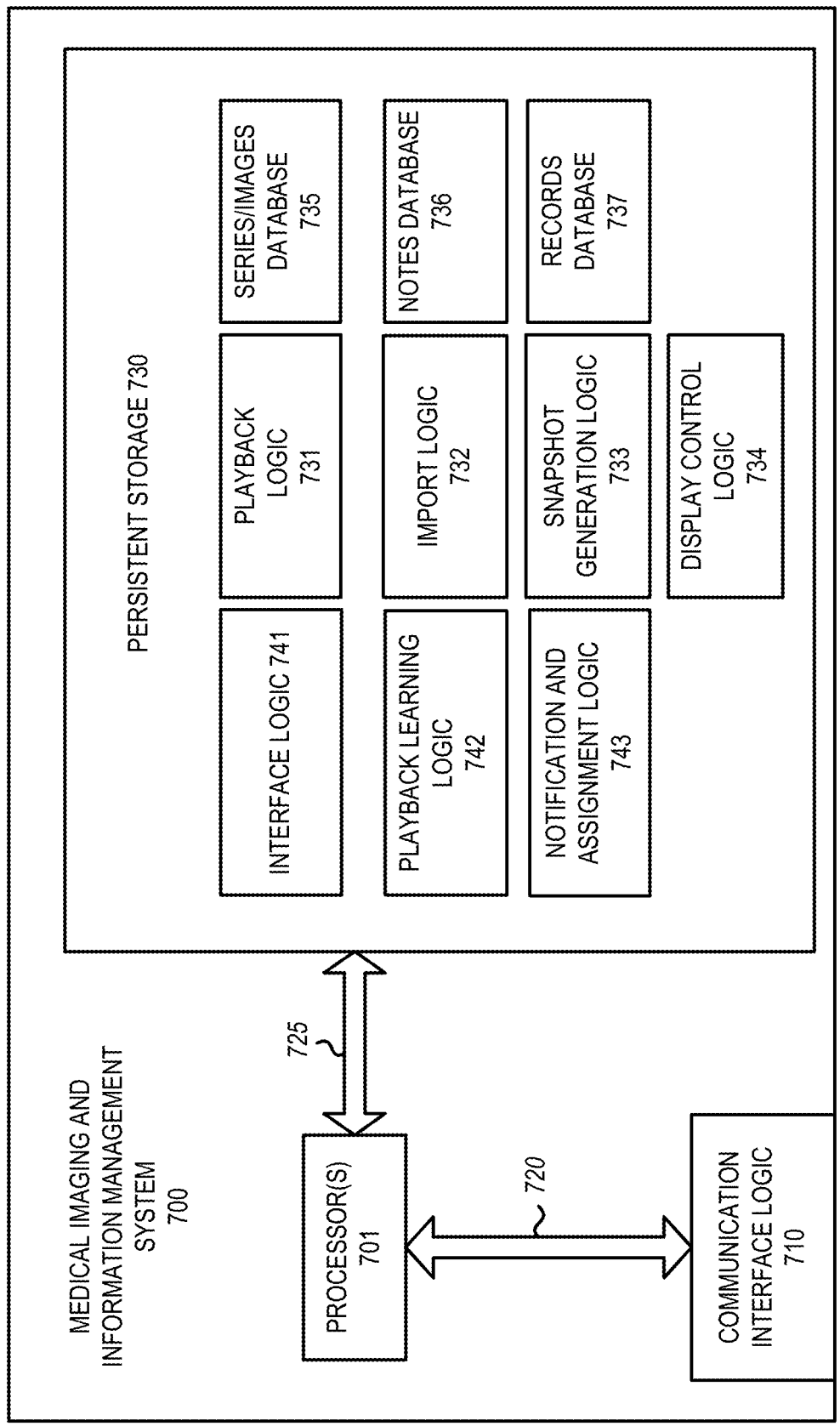
FIG. 7 illustrates an exemplary embodiment of a logical representation of a medical imaging and information management system that generates and renders images from healthcare studies.

FIG. 7 illustrates an exemplary embodiment of a logical representation of a medical imaging and information management system 700 that generates and renders image comparison layouts discussed above. The system performs matching of image series based on image similarity and automatically creates layouts with series images of a current study and one or more past (previously-created) studies. In one embodiment, system 700 is part of a medical image system such as detailed above.

The medical imaging and information management system 700 includes one or more processors 701 that are coupled to communication interface logic 710 via a first transmission medium 720. The communication interface logic 710 enables communications with other electronic devices, specifically enabling communication with remote users such as doctors, nurses and/or medical technicians, remote databases (e.g., PACS) that store healthcare studies, and healthcare modalities that generate and send studies. According to one embodiment of the disclosure, communication interface logic 710 may be implemented as a physical interface including one or more ports for wired connectors. Additionally, or in the alternative, communication interface logic 710 may be implemented with one or more radio units for supporting wireless communications with other electronic devices.

The processor(s) 701 is further coupled to persistent storage 730 via transmission medium 725. According to one embodiment of the disclosure, persistent storage 730 may include (a) user interface logic 741, (b) playback learning logic 742, (c) notification and assignment logic 743, (d) playback logic 731, (e) an import logic 732, (f) a snapshot generation logic 733, (g) a display control logic 734, (h) an images database 735, (i) a notes database 736 and (j) a records database 737.

The user interface logic 741 may include logic for enabling interaction between a user and the display areas being displayed on the screen.

The playback learning logic 742 includes logic for accessing historical user inputs used when navigating images of a series or study and modifying the playback behavior used by the system to navigate the images based on the learned user behavior.

Notification and assignment logic 743 includes logic to issue and send notifications and/or assignments for study reviews.

Playback logic 742, in cooperation with display control logic 734, controls the playback of the images according to playback behavior stored in the system. Playback logic 742 accesses the playback behavior and, based on the playback behavior, fetches displayable images from the cache memory and drawings images in the viewport. In one embodiment, playback logic 742 operates in conjunction with loader logic that obtains images from remote locations and stores them in a cache memory in system 700 so that they may be viewed during playback in a seamless manner.

Import logic 732 may include logic for retrieving one or more pieces of information from a storage device and importing each of the one or more pieces of information into a separate display area of a viewer or viewer template. For example, the pieces of information may include, but are not limited or restricted to, (i) medical images, including x-rays, mammograms, computerized tomography (CT) scans, magnetic resonance imaging (MRI), positron emission tomography (PET) scan and/or ultrasound imaging, (ii) physician's notes regarding one or more of the medical images and/or (iii) medical records corresponding to one or more of the subjects of the one or more medical images.

The snapshot generation logic 733 includes logic for saving at least a first state of the layout template. Saving the first state may include storing, at least, (i) the one or more pieces of information, and (ii) viewing properties of each of the one or more pieces of information in a non-transitory computer-readable medium. The layout template may depict a comparison layout depicting one or more images from a current study and one or more images determined to be similar from one or more previously-created studies.

The display control logic 734 includes logic for displaying images that have been rendered locally from the compressed image pixel data or have been rendered server-side and sent from the server in displayable form. In one embodiment, the display control logic 734 includes logic to display a browser into which the images are displayed.

The images database 735, the notes database 736 and the records database 737 may comprise a single non-transitory computer-readable medium storage device or may each be a separate non-transitory computer-readable medium storage device. The images database 735 stores medical images that a user may import into a display area of a viewer or other GUI. The notes database 736 stores notes recorded by a doctor, nurse, medical technician, etc., that a user may import into a display area of a layout template. Finally, the records database 737 stores medical records that a user may import into a display area of a layout template.

Smooth Image Scrolling with Dynamic Scroll Extension

Figure 8:
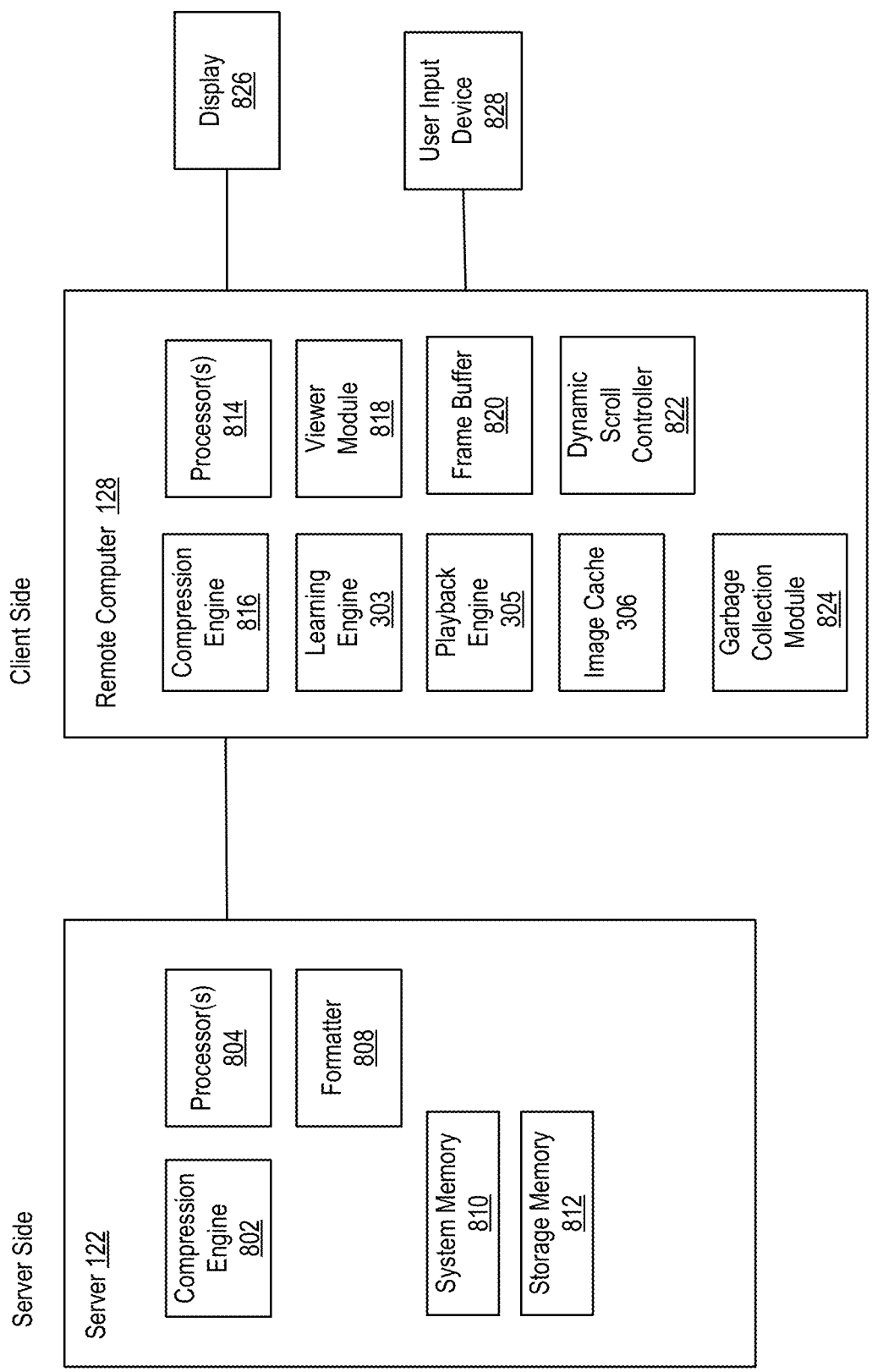
FIG. 8 illustrates a server and a remote computer in a further embodiment of a computing system environment and architecture for displaying series images.

FIG. 8 illustrates a server 122 and a remote computer 128 in a further embodiment of a computing system environment and architecture for displaying medical images, such as images of series of healthcare studies or other series images. The following improvements are made in this embodiment. Variations in the computing system environment and architecture, using various combinations of features from the embodiments in FIGS. 1-7 and embodiments in FIGS. 8-11 could have various combinations or subsets of these improvements.

In one embodiment, the system is configured to perform multiple dynamic scrolling types. In one embodiment, there are three types of dynamic scrolling and these are referred to herein as rapid scrolling, standard scrolling, and precision scrolling. One or more of the dynamic scrolling types is invoked based on a user input and/or action.

Other improvements to the rendering and display of images include embodiments having improved responsiveness to user input with pre-caching of rendered images at client side, instantaneous scroll start and stop against user input, predictability introduced with uniform transition against the type of input and user input device movement, and scroll delta calculation enhancements for smooth navigation and acceleration throughout user interaction, image compression and decompression optimization at one or both of server and client side, disc input/output (I/O) activity optimization that is performed at the client side, and one or more enhancements in memory consumption and memory management at the client side. These are described in more detail below.

In the system, a server 122 is connected to a remote computer 128, for example through a network. A user provides input to remote computer 128 through a user input device 828 and views a series of images on the display 826. In one embodiment, the user controls the scrolling of the images in the series through the user input device 828. On the server side, the server 122 has one or more processors 804 (or a processing device), system memory 810, storage memory 812, a compression engine 802, and a formatter 808. On the client side, remote computer 128 has one or more processors 814 (or a processing device), learning engine 303, playback engine 305, image cache 306 (see FIG. 3), a compression engine 816, viewer module 818, frame buffer 820, dynamic scroll controller 822, and garbage collection module 824.

In one embodiment, dynamic scroll controller 822 coordinates with the user input device 828 and playback engine 305 to implement dynamic scroll control described above and below with reference to FIGS. 8-10B.

In one embodiment, compression engine 802 and formatter 808 are coordinated with compression engine 816 of remote computer 128 and further modules to perform compression and decompression at the server-side and client-side, as discussed above.

In one embodiment, playback engine 305, image cache 306 and garbage collection module 824 are coordinated using an object-oriented scheme described below with reference to FIG. 11.

Figure 9:
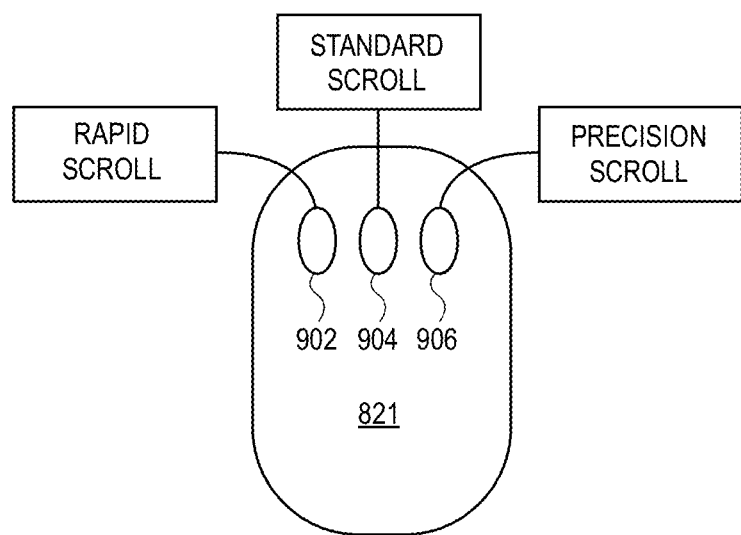
FIG. 9 illustrates an example input device configured for multiple scroll rate ranges for displaying series images.

FIG. 9 illustrates an example input device 828 configured to allow a user to scroll through images using multiple scroll rate ranges when displaying images. In one embodiment, the user input device 828 is a mouse with buttons 902, 904, 906, and in further embodiments could include a scroll wheel, a trackball, a joystick, a wand, foot pedals, eye tracking, head tracking, body tracking, gesture tracking (e.g., with a camera), keyboard input, and/or other input devices that can indicate selection and motion as readily devised in keeping with the teachings herein. The dynamic scroll controller 822 receives input from or operates in response to user operation of the user input device 828 to control a scrolling rate range, a scrolling rate, and/or amount of scrolling at a selected scrolling rate range according to such input. In one embodiment, the left mouse button 902 is configured for rapid scroll, the center or middle mouse button 904 is configured for standard scroll, and the right mouse button 906 is configured for precision scroll. Such configuration could be selected by the user, for example through a menu and soft buttons, a script, a user profile or other known configuration technique and mechanism, and rearrangements of inputs, a greater or lesser number of scrolling rate ranges, etc., are readily devised in variations. In this embodiment, the user presses and holds (or presses and releases to toggle) one of the mouse buttons to select a scrolling rate range, or scrolling type (e.g., rapid, standard, precise, etc.), and moves the mouse to scroll images under control of the scrolling rate within the selected scrolling rate range.

In one embodiment, during operation, the user presses the left mouse button 902 (holding it, or pressing and releasing it to toggle, depending on the set up), thereby selecting rapid scroll operation. Then the user proceeds to move the mouse upward for forward scrolling and/or downward for reverse scrolling or right for forward scrolling and left for reverse scrolling. In one embodiment, this association between mouse movement direction and scrolling direction is selectable along with button configuration for the dynamic scroll controller 822. Moving the mouse slowly results in a slower but still rapid scroll, and moving the mouse more quickly result in a faster (and still rapid) scroll. Thus, even though the scrolling occurs in a rapid scroll mode, there is a range of rapid scrolling that occurs in the mode.

In selecting standard scroll, pressing (and holding or alternatively toggling) the center or middle mouse button 904 causes a change in the scroll rate range to a medium speed range for standard scrolling. Thus, even though the scrolling occurs in a standard scroll mode, there is a range of standard scrolling that occurs in the mode.

When selecting precision scroll, pressing (and holding or alternatively toggling) the right mouse button 906 causes a change in the scroll rate to the slowest scrolling speed rate range, for precision scroll. As with rapid and standard scrolling modes, even though the scrolling occurs in a precise scroll mode, there is a range of precise scrolling that occurs in the mode.

For example, precision scroll could be over a range from one image every second or two images per second, up to 10 images per second, standard scroll could be over a range from 10 images per second to 100 images per second, and rapid scroll could be over a range from 100 images per second to 1000 images per second, or 10,000 images per second. Ranges, and control within a range, could be linear, exponential, logarithmic, or other proportionality in relationship to user input. Boundaries of these ranges, and whether the control is linear throughout the range, exponential or logarithmic throughout the range, etc., could be user configurable, for example during set up through the dynamic scroll controller 822.

Figure 10A:
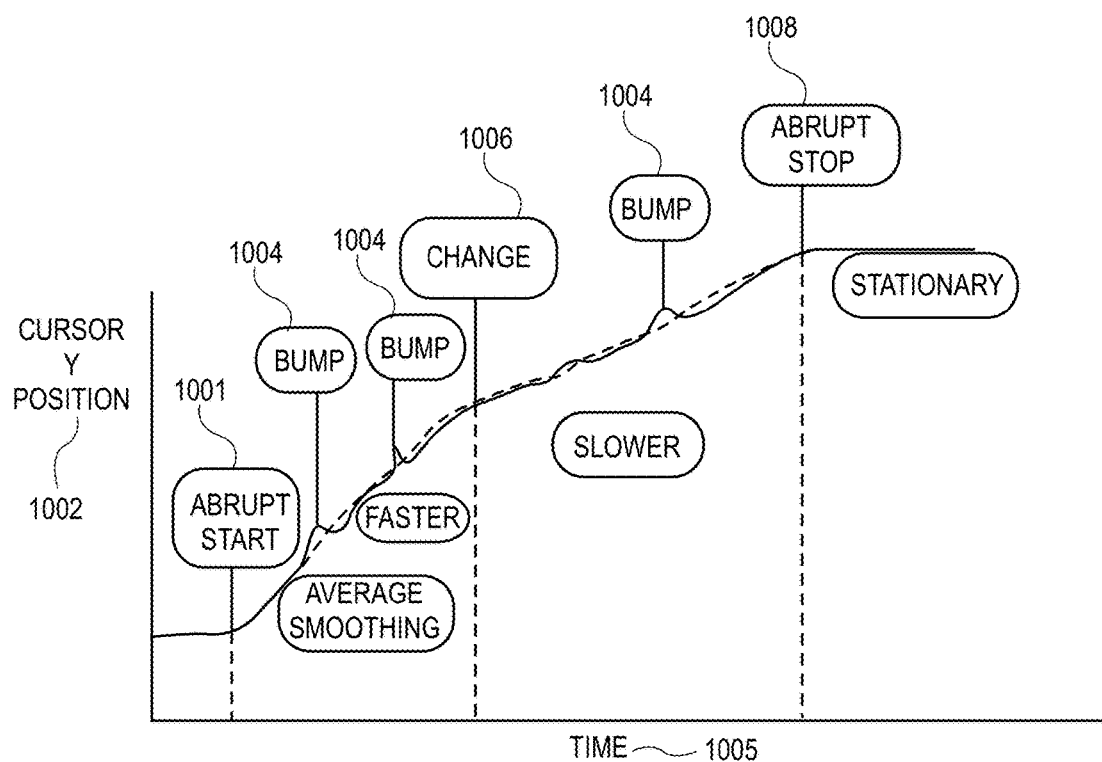
FIG. 10A illustrates a graph of cursor Y position versus time, in an example for controlling scroll rate in displaying series images.

FIG. 10A illustrates a graph of cursor Y position 1002 versus time 1005, in an example illustrating controlling the scroll rate when displaying images (e.g., images in series, or image series, etc.). In this example, the user is moving the user input device 828 in an upward direction, which is shown on the display as a cursor movement in the upward or Y direction, and a variation in implementation can be devised for moving the user input device 828 in a rightward direction and the cursor movement in the right or X direction. For example, the user could be manipulating a slider bar in a graphical user interface, to control image scrolling. At the bottom left of the graph, the cursor Y position 1002 is stationary, corresponding to the user input device 828 not moving, and the images also stationary, or not scrolling. Next, the user moves the user input device 828 upward, and the cursor Y position starts moving upward on the display 826. In one embodiment, the system starts scrolling images with an abrupt start 1001, corresponding to the initial movement of the cursor Y position. That is, the scrolling of images by the system includes an abrupt state 1001. In one embodiment, the rate of scrolling, for abrupt start 1001, is determined by the selection of scroll type or scroll range described above with reference to FIG. 9. In one embodiment, dynamic scroll controller 822 and/or playback engine 305, in coordination with learning engine 303, calculates the scroll delta from scroll rate 1010. The calculation may include, for example calculating that every tenth, one hundredth or other interval (delta) image is to be displayed, while skipping other images in between the displayed images. In order to control the scrolling smoothly, avoiding jerky image rates when the user introduces a bump 1004 in cursor movement, in one embodiment, the dynamic scroll controller 822 uses an input data smoothing technique, such as, for example, but not limited to, average smoothing 1009 by averaging the movement of the user input or cursor display, for example over a specified sliding time window. Average smoothing 1009 is depicted in FIG. 10A by the dashed line that smoothes the bumps 1004 and smoothes the change 1006 in the speed of cursor Y position 1002 movement. In one embodiment, the rate of movement of the cursor Y position 1002, or velocity of cursor Y position 1002, determines the scrolling rate within the selected scrolling rate type or range. Therefore, for example, from the abrupt start 1001 up to the change 1006, the user is making the cursor Y move faster for a faster scrolling rate within the selected range, and from the change 1006 to the abrupt stop 1008, the user is making the cursor type Y move slower for a slower scrolling rate within the selected range. At the abrupt stop 1008, the user stops making the cursor Y position 1002 move, corresponding to the user input device 828 not moving, and the images also become stationary, or not scrolling, as directed by the dynamic scroll controller 822. The abrupt stop 1008 avoids image scrolling overshooting (i.e., scrolling past) an image of interest to a user. That is, in one embodiment, the scrolling of images includes using an abrupt stop operation to stop scrolling and avoid image scrolling overshooting (i.e., scrolling past) an image of interest to a user.

In one embodiment, it is preferred to use the cursor Y position 1002, or cursor X position, for input to dynamic scroll controller 822 to control scrolling rate, rather than using the input directly from the user input device 828, although such can be done in other embodiments. For example, in one embodiment, the system watches for an interrupt, signal or message once per frame at the frame rate for the display 826, or twice per frame or other timing, samples the cursor Y position 1002, and then determines the image scroll rate or the delta number of images from one frame to the next frame for the frame buffer 820. In this way, the image scroll rate is updated once per frame (or twice per frame or other timing) and changes smoothly with the frames being displayed by the viewer module 818 from the frame buffer 820, rather than being updated every time the user input device 828 moves or every time the user input device 828 sends an interrupt, signal or message, which is not coordinated with the frame rate of display 826 and may result in jerky image scrolling.

Another aspect of basing scrolling control on the cursor Y position 1002, and not on raw input from the user input device 828, is that there is a wide variety of user input devices 828, and user preferences for such devices. Also there is a variety of platforms for the remote computer 128 with different operating systems, processor(s) 814 and system hardware. Basing the scrolling control on the cursor Y position 1002 provides a user experience that is relatively platform-independent, user input device independent, system hardware independent, and takes into account user settings for user input devices. For example, a high resolution mouse and a low-resolution mouse (or other user input device 828) would have different scaling through the mouse driver to arrive at cursor movement, and basing the scrolling control on the cursor Y position 1002 relies on this scaling to provide scrolling control that is independent of the resolution of the mouse hardware. Likewise, one user may prefer a faster mouse or user input device response than another user who prefers a slower mouse or user input device response, and these users have adjusted settings for the mouse driver accordingly. Basing the scrolling control on the cursor Y position 1002 relies on these user settings in the mouse driver to provide scrolling control that is independent of or takes into account user input device settings. With various combinations of the above and below features, there are multiple embodiments for the scroll delta calculation enhancements, which the learning engine 303 tracks and coordinates with various modules in the remote computer 128. In one embodiment, the learning engine refines the input based on the Y position to provide a scrolling experience consistent across platforms.

Figure 10B:
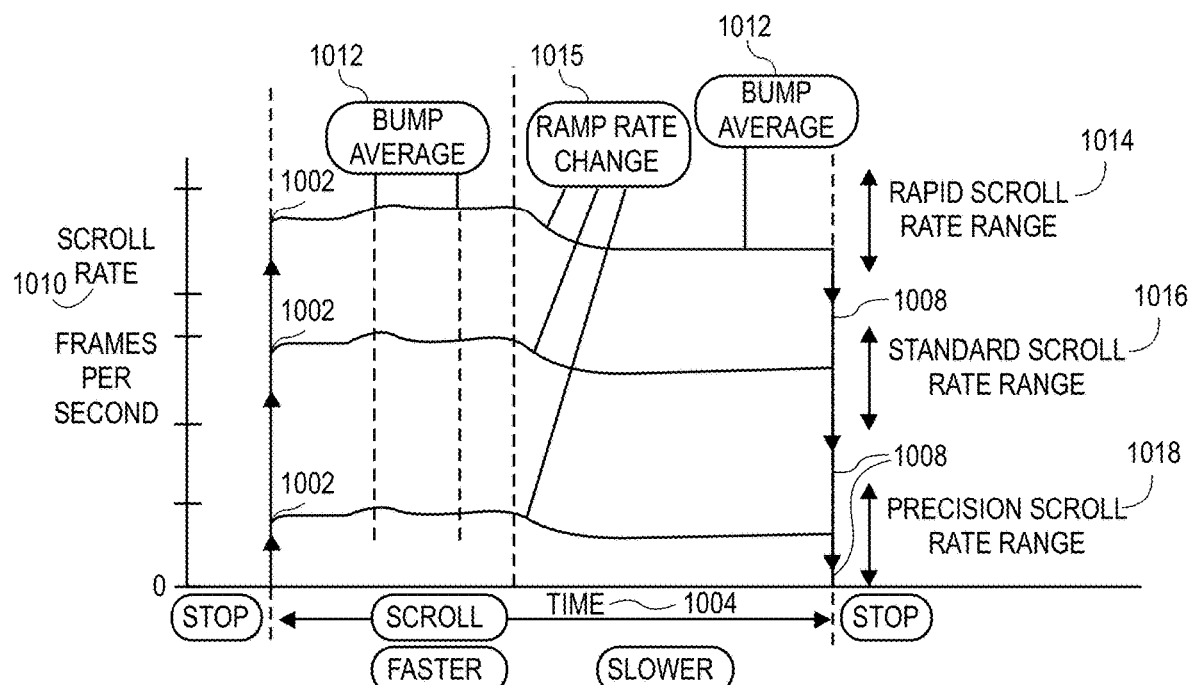
FIG. 10B illustrates a graph of scroll rate versus time, in a multiple range example for controlling scroll rate in displaying series images.

FIG. 10B illustrates a graph of scroll rate 1010 versus time, in a multiple range example for controlling the scroll rate in displaying series images. In one embodiment, the system controls image scroll rate to correspond to the cursor Y position 1002 as shown in FIG. 10A. At the lower left of the graph, the scroll rate is zero or stopped. At the abrupt start 1001, corresponding to initial movement of the cursor Y position 1002 (in FIG. 10A), the image scroll rate jumps abruptly from zero to a scroll rate 1010 in the selected scroll rate range, for example a lower value, middle value, or proportional value in the selected range. Alternatively, the scroll rate could ramp upward to a scroll rate 1010, smoothly joining the scroll rate calculated by averaging the slope of the cursor Y position 1002 over time 1005 (e.g., with a sliding time window for average smoothing 1009). In one embodiment, the scroll rate is based on a continuous set of past inputs. A continuous set of inputs confirms user intention to stay in a new scroll level. Continuing to use average smoothing 1009, the scroll rate and image scrolling vary smoothly even when the cursor Y position 1002 has a bump 1004, as shown in the bump average 1012. When the change 1006 occurs in the rate of movement of the cursor Y position 1002, e.g., when the cursor Y position 1002 changes from moving faster to moving slower, the dynamic scroll controller 822 introduces a ramp rate change 1015 and gradually slows the scroll rate to a lower value, still within the selected scroll rate range. In one embodiment, this is a direct result of using average smoothing 1009, as described above. In another embodiment, this is deliberately introduced through a fixed or user adjustable parameter. In one embodiment, a similar change in ramp rates takes place when scroll rate is increased, within a selected scroll rate range.

FIG. 10B illustrates three ranges, a rapid scroll rate range 1014, a standard scroll rate range 1016, and a precision scroll rate range 1018, corresponding to the user selection described above with reference to FIG. 9. For example, if the user selects rapid scroll, the scroll rate 1010 is controlled by the cursor Y position 1002 movement to be in the rapid scroll rate range 1014. If the user selects standard scroll, the scroll rate 1010 is controlled by the cursor Y position 1002 movement to be in the standard scroll rate range 1016, and, if the user selects precision scroll, the scroll rate 1010 is controlled by the cursor Y position 1002 movement to be in the precision scroll rate range 1018, for example from zero images per second (images stationary) to the upper limit of the precision scroll rate range. Before the abrupt start 1001, and after the abrupt stop 1008, the scroll rate is zero or scrolling is stopped. Embodiments of the system that have the abrupt start 1001 and the abrupt stop 1008 provide responsiveness of control and viewing, avoiding the need for user correction for undershoot or overshoot of image display from an image sequence.

Various versions may use continuous or discrete values of scroll rate within a selected scroll rate range 1014, 1016, 1018, and may use thresholds of cursor Y position 1002 velocity and/or hysteresis in the thresholds when changing from one scroll rate 1010 to another discrete scroll rate 101. This may be used for smoothness and to avoid jumpiness. Transitions between discrete scroll rates 1010, in such embodiments, could be abrupt or ramped gradually. Relatedly, transitions between selected scroll rate ranges 1014, 1016, 1018 could be abrupt or ramped gradually, when a user selects a different scroll rate range while moving the user input device 828. In one embodiment, the closer together the discrete scroll rates are within a selected scroll rate range, the more this approximates a continuous variability of scroll rate.

The various trade-offs combining these and further aspects may be explored by a system designer focused on user experience. With various combinations of the above features, there are multiple embodiments for different dynamic scroll types for meeting various user needs, instantaneous (i.e., abrupt) scroll start and stop against user input, predictability with uniform transition against type of input and mouse or other user input device movement, and scroll delta calculation enhancements in the learning engine 303 for smooth navigation and acceleration throughout user interaction. Some of the above-described features act to improve responsiveness to user input, and further features below describe pre-caching of rendered images at the client side for improved responsiveness to user input. Reverse scrolling is readily visualized and developed, using cursor Y position 1002 movement in the opposite direction, and reverse scrolling of images.

Further to the goal of smooth image scrolling, it has been observed that some image scrolling systems experience disruption in the midst of scrolling through large numbers of images. One source of such disruption is background tasks assigned to managing these large numbers of images and which consume processing resources to such a degree that the scrolling does not reliably keep up with the display frame rate. This disruption manifests as jerky scrolling or an uneven scrolling rate, not a smooth scrolling experience for the user. An improvement in image management, resulting in smoother image scrolling, is described below.

Figure 11:
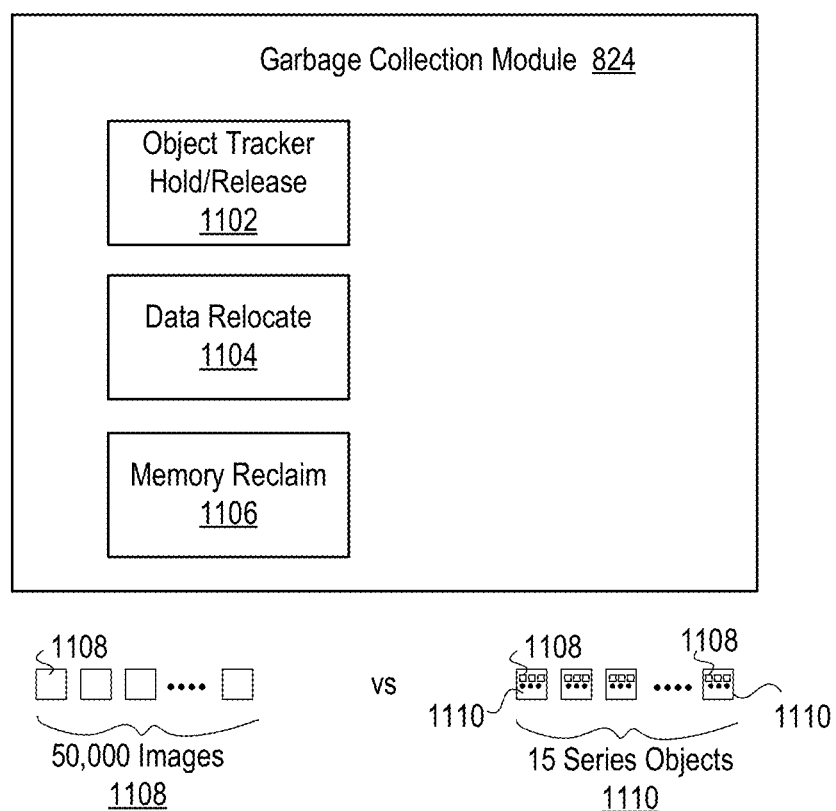
FIG. 11 illustrates garbage collection in an example where each image is an object versus an example where images are organized hierarchically in series objects.

FIG. 11 illustrates garbage collection in an example where each image 1108 is an object versus an example where images 1108 are organized hierarchically in series objects 1110. There are multiple benefits in using series objects, affecting garbage collection, processing resource allocation, and ultimately the smoothness of image scrolling. These benefits are contrasted below in a comparison to the use of each image 1108 as an object, and system embodiments may use one, the other or a combination of both techniques for various trade-offs in system performance.

In both examples, the system is using object-oriented programming, for example object-oriented database management. Garbage collection module 824 has an object tracker 1102 that tracks each object and determines whether the object is to be held in memory, or released for erasure, in a hold/release decision. A data relocate module 1104 relocates objects that are to be held in memory, in the case where the memory occupied by an object is also occupied by sufficient data that is no longer in use and can be reclaimed by the memory reclaim module 1106 as part of the garbage collection process. In one embodiment, the memory reclaim module 1106 erases memory that is either released as holding an object no longer in use, or has had an object moved out of that memory space by the data relocate module 1104, or some combination of both. Further aspects of garbage collection are relied upon as readily devised in keeping with the teachings herein and/or known and not further described herein.

In the lower left example of FIG. 11, each image 1108 of a very large number of images (example, 50,000 images 1108) is an object. The object tracker 1102 devotes much time and memory space to tracking all of the objects, frequently relocating data with the data relocate module 1104, and this may intrude upon processing power and time that would have been used for managing the images for display 826, resulting in jerky image rates and/or jerky image scrolling that might not have been a problem with a smaller number of objects or images. Another problem is that images may be erased, and then re-rendered if reverse scrolling occurs, and this consumes processing resources and may result in jerky reverse image scrolling.

In the lower right example of FIG. 11, a special type of object referred to herein as a series object 1110 includes a hierarchical organization of many images 1108. In this example, the same 50,000 images 1108 are organized into 15 series objects 1110. Each set of related images 1108 is organized as a series object 1110, and further examples with other numbers of images and objects are readily devised. Because there are only 15 series objects 1110, the object tracker 1102 devotes or consumes far less time, memory space and processing power to tracking these few objects than is the case for 50,000 images each of which is an object. Much less often, one of the series objects 1110 is released or needs to be moved so that memory can be reclaimed. This is far less disruptive for image rates and image scrolling, when there are large numbers of images, and results in smoother image rates and smoother image scrolling. A further beneficial effect is that reverse scrolling is smoother, since the images remain in memory, for example in the image cache 306, for as long as the corresponding series object 1110 is tracked as hold. Only when the series object 1110 is released are the corresponding images in the series object 1110 released. Bundling all of the images of a series together as one series object 1110 means garbage collection does not spend the time looking through all of the images while that one object is in use in scrolling, and garbage collection only operates on images of an object when that object is no longer in use in scrolling. In one embodiment, many images are bundled together as a series object. In one embodiment, all images belonging to one category of viewing or manipulation are bundled together as a series object. This retains related images and memory without losing them to garbage collection and decreases the amount of processing overhead that the system is spending on garbage collection, so there is more processing available for the scrolling. One suitable format for series objects 1110 is JSON (JavaScript object notation), which lets an object define hierarchical data.

With reference back to FIGS. 8-11, various system embodiments can use various combinations or all of the following features. Remote computer 128 could request, from server 122, all of the images 1108 of interest, or an entire series object 1110. Server 122 then uses compression engine 802 to compress the requested data, transmit the compressed data over a network, and remote computer 128 uses compression engine 816 to decompress the data, render images and store rendered images in image cache 306. Dynamic scroll controller 822 directs frame buffer 820 and playback engine 305 to use selected images (and skip non-selected images) from image cache 306, according to the scroll rate.

In one embodiment, remote computer 128 requests, from server 122, images 1108 that are predicted for the near-term scrolling according to the controlled scrolling rate or remote computer 128 could have cached all of the images 1108 in a series, or of a series object 1110, and selects and displays only the images according to the controlled scrolling rate.

In one embodiment, server 122 uses compression engine 802 to compress images retrieved from storage memory 812 or system memory 810 and sends those compressed images over a network to the remote computer 128. In one embodiment, server 122 has stored compressed images and sends those compressed images over the network to the remote computer 128. Remote computer 128 receives the compressed images and stores them, as compressed images in image cache 306. Then, remote computer 128 fetches each compressed image from image cache 306, uses compression engine 816 to decompress the image, and writes the decompressed image to frame buffer 820 for use by viewer module 818 and playback engine 305 to scroll through the images 1108 (in the appropriate format) on display 826. In one embodiment, frame buffer 820 stores one or multiple images for corresponding one or multiple frames for viewer module 818 to send to the display 826. In one embodiment, viewer module 818 reformats the decompressed images for display in a specified format that suits the viewer module 818. For example, this may be a format for a specified browser. In another embodiment, remote computer 128 receives the compressed images, decompresses the images and formats them for viewer module 818 before storing the formatted images in image cache 306. In another version, images 1108 are stored in image cache 306 in compressed form, after being formatted for the viewer module 818. In any of these embodiments, images 1108 in various formats can be managed as each image 1108 is an object, or as images 1108 in a series object 1110, or combinations thereof.

In one embodiment, server 122 uses formatter 808 to format images 1108 for viewer module 818 of remote computer 128, for example in a format for a browser. Server 122 then compresses the formatted images, using compression engine 802 and sends the formatted, compressed images over a network to remote computer 128.

Remote computer 128 receives the formatted compressed images and either stores those in the image cache 306, for decompression and display, or in one embodiment decompresses and stores the uncompressed formatted images in image cache 306, ready for display 826 through viewer module 818 and frame buffer 820. There are thus multiple embodiments for pre-caching of rendered images at the client side, with variations for compression, decompression and formatting.

In one version, disk operations are serialized, only one file is allowed in the read environment and only one file is allowed in the write environment. For example, this can be accomplished using the series objects 1110, where only one series object 1110 is being operated upon and viewed at any given time. Doing so improves scrolling, which can be jerky when there are many disk or other memory writes in parallel and many disk or other memory reads in parallel. A variation for this or other versions is to have multiple threads for both compression and decompression so there is parallel processing. Multiple threads can be applied for serialized operations as above, in some versions.

Figure 12:
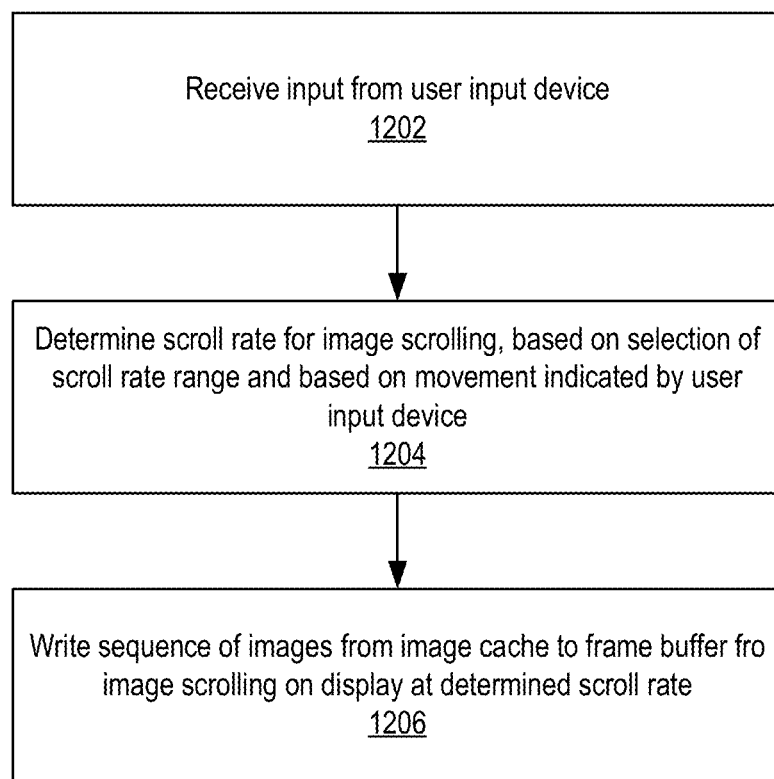
FIG. 12 is a flow diagram of a method for image scrolling, which can be performed by a processor-based system, including embodiments of computing system environments and architectures for displaying series images described herein.

FIG. 12 is a flow diagram of a method for image scrolling, which can be performed by a processor-based system, including embodiments of computing system environments and architectures for displaying series images described herein.

In an action 1202, the system receives input from a user input device. The user input device could be a mouse or other type of input device as readily devised and understood, examples of some of which are given above.

In an action 1204, the system determines scroll rate for image scrolling. The determination of scroll rate is based on a selection of scroll rate range and is also based on movement indicated by the user input device. Selection of scroll rate range is a selection of a scroll rate range from among multiple possible scroll rate ranges. For example, the scroll rate ranges from which to choose could include precision scroll, standard scroll, and rapid scroll and each of these could be selected through a user pressing a mouse button, or other user input device operation.

In an action 1206, the system writes a sequence of images from an image cache to a frame buffer, for image scrolling on a display at the determined scroll rate. Faster rates of image scrolling skip images in between selected, displayed images. Slower rates of image scrolling may show images at various rates. Various mechanisms for smoothing the scrolling and changes in scroll rate are described above.

Figure 13:
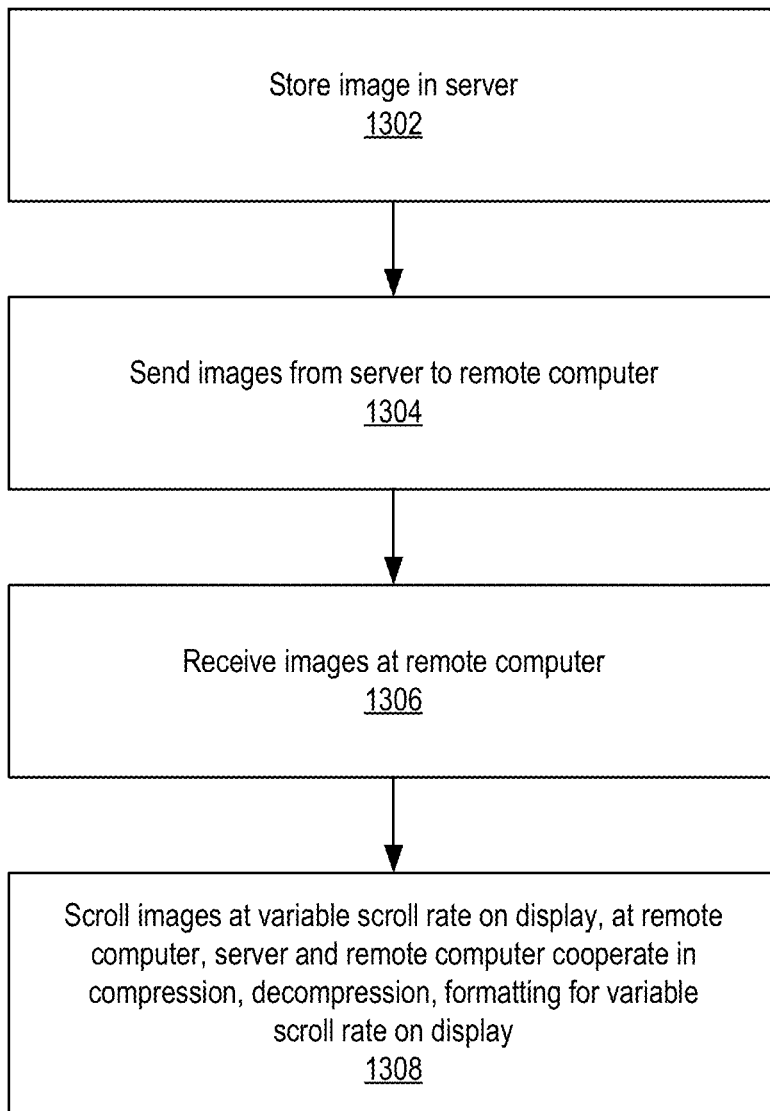
FIG. 13 is a flow diagram of a method for image scrolling, featuring image compression, decompression and formatting for a variable scroll rate, which can be performed by a processor-based system, including embodiments of computing system environments and architectures for displaying series images described herein.

FIG. 13 is a flow diagram of a method for image scrolling, featuring image compression, decompression and formatting for a variable scroll rate, which can be performed by a processor-based system, including embodiments of computing system environments and architectures for displaying series images described herein.

In an action 1302, the system stores images in a server. A wide variety of servers could be suitable, and it should be understood that the storage memory could physically be in any of a variety of locations, including local storage, distributed storage or cloud storage, all of which are considered inclusive under the meaning of storing images in a server.

In an action 1304, the system sends images from the server to a remote computer. For example, the server could send the images over a network to the remote computer, or via a direct connection, wired or wireless, etc.

In an action 1306, the system receives the images at the remote computer. For example, the remote computer could receive images from the server over a network, or via a direct connection, wired or wireless, etc. Variations are described above in which the system sends all of the images of a series or series object, or requests and sends only images that are predicted to be shown at the variable scroll rate on the display.

In an action 1308, the remote computer scrolls images at a variable scroll rate on a display. The server and the remote computer cooperate in compression, decompression and formatting for the variable scroll rate on the display. Various formats and types of compression and decompression may be suitable, and examples are given of variations of these relative to how and where images are stored, transmitted and rendered for scrolling, and optimizations relative to these variations.

Figure 14:
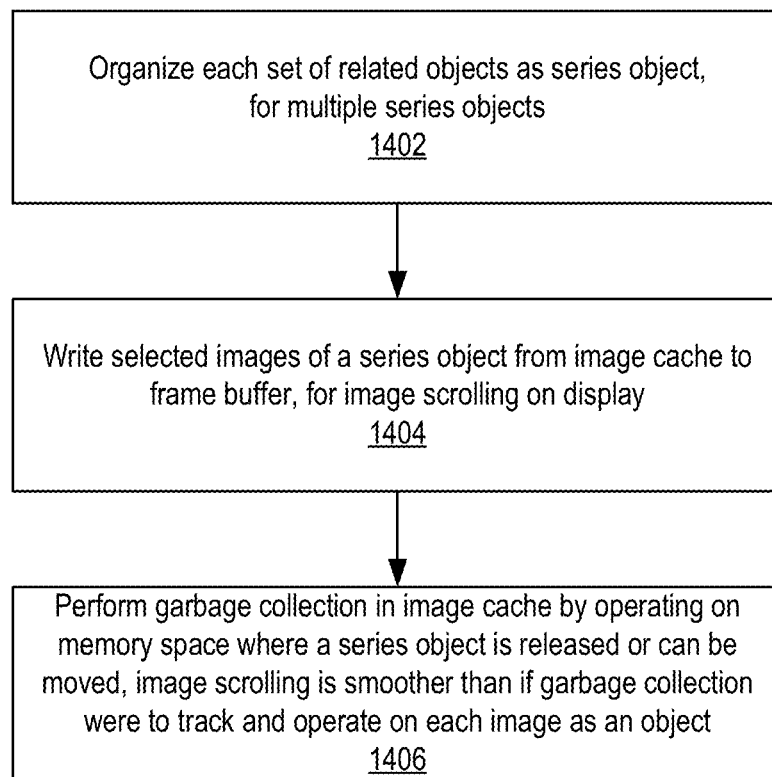
FIG. 14 is a flow diagram of a method for image scrolling, featuring series objects, which can be performed by a processor-based system, including embodiments of computing system environments and architectures for displaying series images described herein.

FIG. 14 is a flow diagram of a method for image scrolling, featuring series objects, which can be performed by a processor-based system, including embodiments of computing system environments and architectures for displaying series images described herein.

In an action 1402, the system organizes each set of related objects as a series object. There are multiple series objects. For example, the system could organize images belonging to a category of viewing or manipulation, the system could organize a set of related images as hierarchical data, and/or the system could use object-oriented programming and JSON as a format, for series objects.

In an action 1404, the system writes selected images of a series object from an image cache to a frame buffer, for image scrolling on a display. Various embodiments of systems and image scrolling are described above, including variable scrolling rate mechanisms.

In an action 1406, the system performs garbage collection in the image cache. The garbage collection is performed by operating on memory space where a series object is released or can be moved. Image scrolling is smoother than if garbage collection were to track and operate on each image as an object.

With various combinations of the above features, there are multiple embodiments for image compression and decompression optimization at both server and client side. There are multiple embodiments for disk I/O activity optimization at the client side. There are multiple embodiments for enhancement in memory consumption and memory management at the client side. Various modules and components can be implemented in hardware, software executing on one or more processors, firmware, or combinations thereof.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system for image scrolling, comprising:
   an image cache;
   a frame buffer;
   a memory;
   one or more processors in communication with the memory, the image cache, and the frame buffer;
   program instructions executable by the one or more processors via the memory to perform a method, the method comprising:
      organizing, by the one or more processors, each set of related images as a series object, for a plurality of series objects, wherein each series object comprises multiple images, wherein each series object comprises a hierarchical organization of the multiple images, and wherein each series object comprises images of a category of viewing or manipulation;
      writing, by the one or more processors, the plurality of series objects from the image cache to the frame buffer, for image scrolling on a display;
      maintaining, by the one or more processors, a smooth scrolling appearance for the image scrolling on the display based on managing a processing load of the one or more processors, wherein the managing comprises decreasing processing overhead in the processing load related to garbage collection and increasing processing capacity in the processing load available for the image scrolling, wherein the managing comprises:
         determining, by the one or more processors, that at least one series object comprising a given set of multiple images of the plurality of series objects is no longer in use from the frame buffer in image scrolling on the display; and
         based on the determining, performing, by the one or more processors, garbage collection in the image cache by operating on memory space in the image cache by releasing or moving the at least one series object of the plurality of series objects from the image cache, to reclaim a portion of the memory, wherein releasing the at least one series object comprises releasing each image of the given set of multiple images.

2. The system for image scrolling of claim 1, the method further comprising:
   tracking, by the one or more processors, one of the plurality of series objects as hold; and
   retaining, by the one or more processors, the one of the plurality of series objects in the image cache for reverse scrolling on the display, as a result of the tracking.

3. The system for image scrolling of claim 1, wherein memory operations are serialized, only one file is allowed in a read environment, and only one file is allowed in a write environment.

4. The system for image scrolling of claim 1, wherein only one series object is being operated upon and viewed at a time.

5. The system for image scrolling of claim 1, wherein writing the plurality of series objects from the image cache to the frame buffer comprises utilizing multiple threads for serialized memory operations.

6. A computer-implemented method for image scrolling, comprising:
   organizing, by the one or more processors, each set of related images as a series object, for a plurality of series objects, wherein each series object comprises multiple images, wherein each series object comprises a hierarchical organization of the multiple images, and wherein each series object comprises images of a category of viewing or manipulation;
   writing, by the one or more processors, the plurality of series objects from the image cache to the frame buffer, for image scrolling on a display;
   maintaining, by the one or more processors, a smooth scrolling appearance for the image scrolling on the display based on managing a processing load of the one or more processors, wherein the managing comprises decreasing processing overhead in the processing load related to garbage collection and increasing processing capacity in the processing load available for the image scrolling, wherein the managing comprises:
      determining, by the one or more processors, that at least one series object comprising a given set of multiple images of the plurality of series objects is no longer in use from the frame buffer in image scrolling on the display; and
      based on the determining, performing, by the one or more processors, garbage collection in the image cache by operating on memory space in the image cache by releasing or moving the at least one series object of the plurality of series objects from the image cache, to reclaim a portion of the memory, wherein releasing the at least one series object comprises releasing each image of the given set of multiple images.

7. The method of claim 6, further comprising:
   tracking, by the one or more processors, one of the plurality of series objects as hold; and
   retaining, by the one or more processors, the one of the plurality of series objects in the image cache for reverse scrolling on the display, as a result of the tracking.

8. The method of claim 6, wherein memory operations are serialized, only one file is allowed in a read environment, and only one file is allowed in a write environment.

9. The method of claim 6, wherein only one series object is being operated upon and viewed at a time.

10. The method of claim 6, wherein the writing the selected images from the image cache to the frame buffer includes using multiple threads for serialized memory operations.

11. A computer program product comprising:
    a non-transitory computer readable storage medium readable by one or more processors and storing instructions for execution by the one or more processors for performing a method comprising:
       organizing, by the one or more processors, each set of related images as a series object, for a plurality of series objects, wherein each series object comprises multiple images, wherein each series object comprises a hierarchical organization of the multiple images, and wherein each series object comprises images of a category of viewing or manipulation;

writing, by the one or more processors, the plurality of series objects from the image cache to the frame buffer, for image scrolling on a display;

maintaining, by the one or more processors, a smooth scrolling appearance for the image scrolling on the display based on managing a processing load of the one or more processors, wherein the managing comprises decreasing processing overhead in the processing load related to garbage collection and increasing processing capacity in the processing load available for the image scrolling, wherein the managing comprises:

determining, by the one or more processors, that at least one series object comprising a given set of multiple images of the plurality of series objects is no longer in use from the frame buffer in image scrolling on the display; and based on the determining, performing, by the one or more processors, garbage collection in the image cache by operating on memory space in the image cache by releasing or moving the at least one series object of the plurality of series objects from the image cache, to reclaim a portion of the memory, wherein releasing the at least one series object comprises releasing each image of the given set of multiple images.

12. The computer-readable media of claim 11, the method further comprising:

tracking, by the one or more processors, one of the plurality of series objects as hold; and retaining, by the one or more processors, the one of the plurality of series objects in the image cache for reverse scrolling on the display, as a result of the tracking.

13. The computer-readable media of claim 11, the method further comprising:

serializing, by the one or more processors memory operations, allow only one file in a read environment and allow only one file in a write environment.

14. The computer-readable media of claim 11, wherein the one or more processors operate on only one series object at a time for viewing.

15. The computer-readable media of claim 11, wherein writing the plurality of series objects from the image cache to the frame buffer comprises utilizing multiple threads for serialized memory operations.

* * * * *